(12) United States Patent
Ishizaka et al.

(10) Patent No.: US 6,426,236 B1
(45) Date of Patent: Jul. 30, 2002

(54) METHOD FOR MAKING SEMICONDUCTOR OPTICAL MODULATOR

(75) Inventors: Masashige Ishizaka; Hiroyuki Yamazaki, both of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/643,158

(22) Filed: Aug. 21, 2000

Related U.S. Application Data

(62) Division of application No. 08/859,896, filed on May 21, 1997.

(30) Foreign Application Priority Data

May 22, 1996 (JP) .............................................. 8-127497

(51) Int. Cl.[7] .............................................. H01L 21/00
(52) U.S. Cl. ........................... 438/29; 438/22; 438/24; 438/48; 438/46; 438/47; 438/54; 257/21; 257/22; 257/82; 257/94; 257/108; 257/113; 257/421; 257/431; 257/434; 257/436
(58) Field of Search ........................... 257/21, 22, 82, 257/94, 108, 113, 184, 421, 431, 434, 436; 438/29, 48, 24, 22, 46, 47, 54, 69

(56) References Cited

U.S. PATENT DOCUMENTS 5,565,693 A * 10/1996 Sasaki et al. ................. 257/94
5,757,985 A * 5/1998 Ishizaka ........................ 385/2

* cited by examiner

Primary Examiner—Douglas A. Willie
Assistant Examiner—Wai-Sing Louie
(74) Attorney, Agent, or Firm—Hayes Soloway P.C.

(57) ABSTRACT

Disclosed is an electroabsorption-type optical modulator, which has: a semiconductor substrate; and a semiconductor buffer layer, a semiconductor optical absorption layer and a semiconductor cladding layer which are layered in this order on the semiconductor substrate; wherein the absorption of a light wave supplied to an end of the semiconductor optical absorption layer is controlled by changing an intensity of electric field applied to the semiconductor optical absorption layer; and the semiconductor optical absorption layer has a region with absorption-edge wavelength shorter than that of the other region of the semiconductor optical absorption layer and a voltage corresponding an external electrical signal is simultaneously applied to both the regions of the semiconductor optical absorption layer, so that, to an incident light, a refractive index of the semiconductor optical absorption layer is decreased and an absorption coefficient of the semiconductor optical absorption layer is increased when an intensity of electric field applied to the semiconductor optical absorption layer corresponding to the external electrical signal is increased.

2 Claims, 14 Drawing Sheets

$\Delta\lambda_{OP} = \lambda_{OP} - \lambda_g$ $\lambda_g$ : ABSORPTION-EDGE WAVELENGTH OF OPTICAL ABSORPTION LAYER $\lambda_{OP}$ : INCIDENT-LIGHT WAVELENGTH

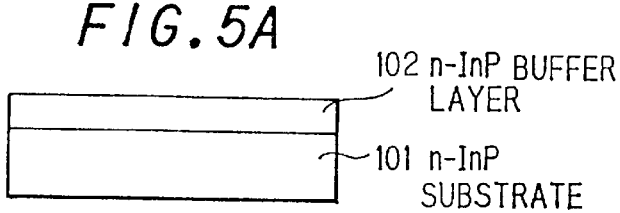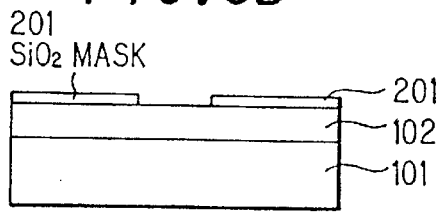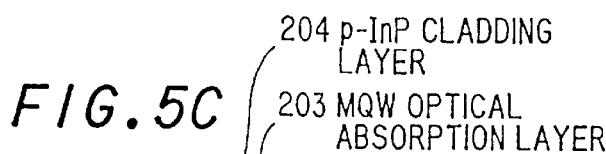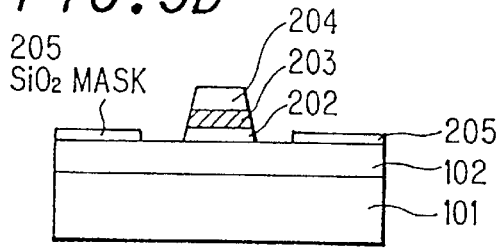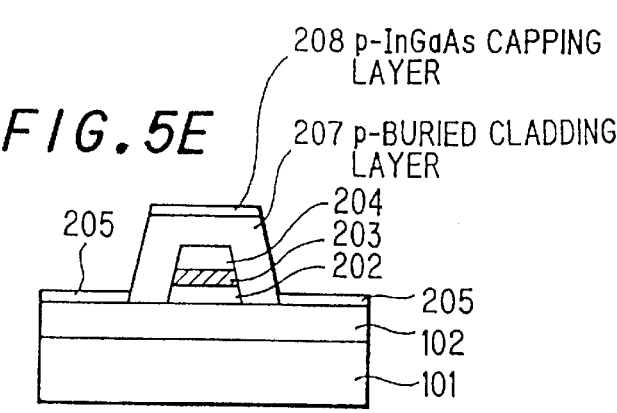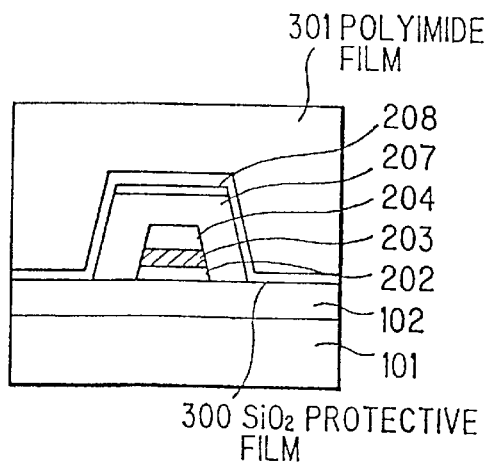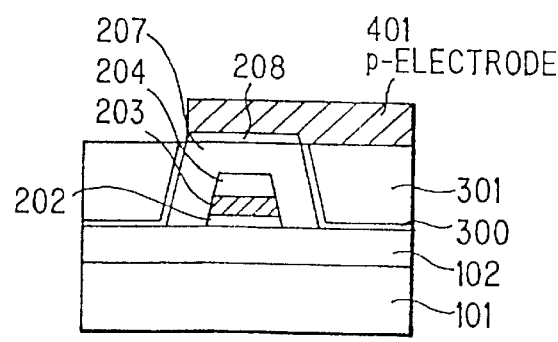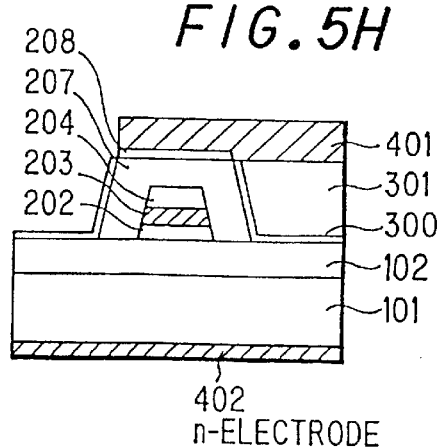

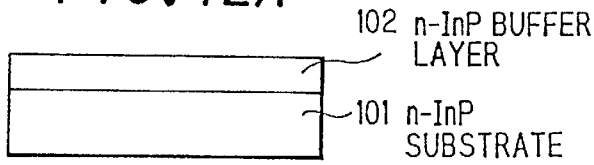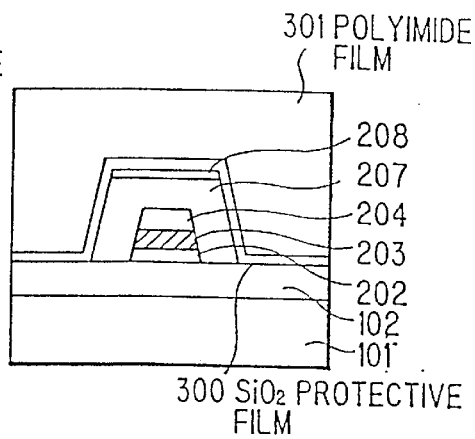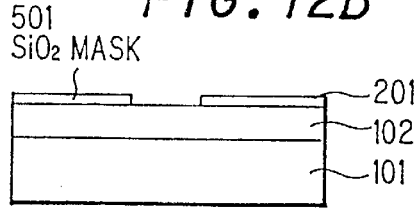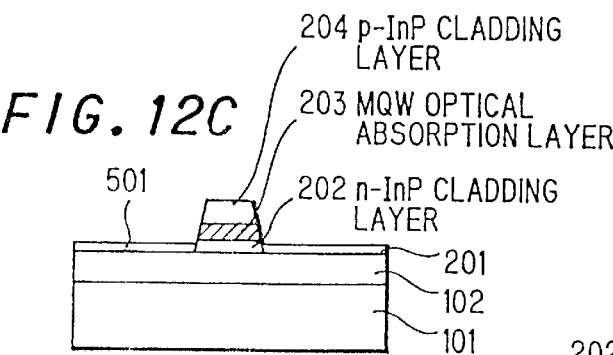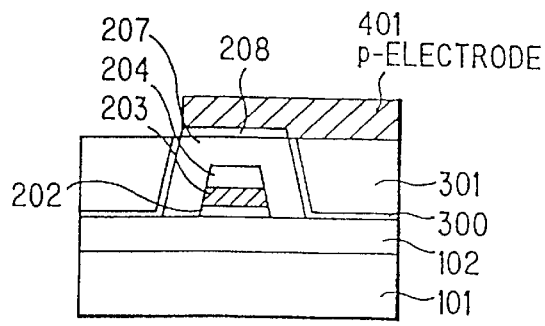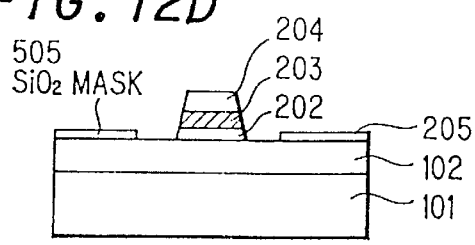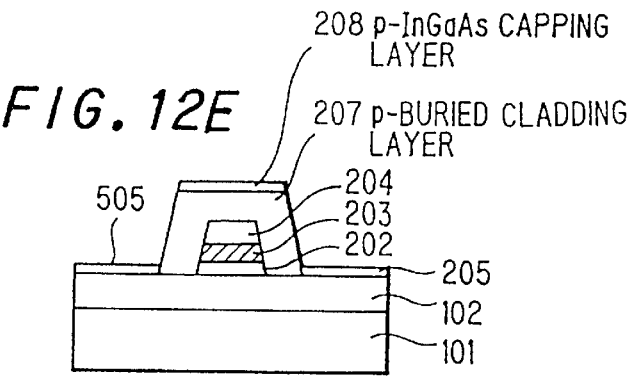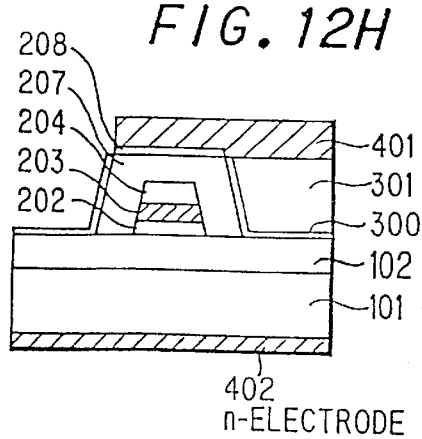

METHOD FOR MAKING SEMICONDUCTOR OPTICAL MODULATOR

This application is a division of application Ser. No. 08/859,896 filed May 21, 1997.

FIELD OF THE INVENTION

This invention relates to a semiconductor optical modulator, and more particularly to, an electroabsorption-type optical modulator in which the absorption of a light wave supplied is controlled by changing an intensity of electric field applied to a semiconductor optical absorption layer, and to a method for making the same.

BACKGROUND OF THE INVENTION

Recently, with the development of high-speed and long-distance optical communication systems, there occurs a problem in conventional direct modulation systems with semiconductor lasers. Namely, in conventional semiconductor laser direct modulation systems, wavelength chirping occurs when the modulation is conducted, whereupon the waveform, after transmitting through an optical fiber, is deteriorated. This phenomenon is amplified with an increase in signal modulation frequency or transmission distance. Especially, in a system that uses a conventional 1.3 $\mu$m zero-dispersion fiber, this problem is serious. Even if a light source with a wavelength band of 1.55 $\mu$m that has a small fiber propagation loss is used to increase transmission distance, the transmission distance is limited by dispersion limitation due to chirping.

This problem can be solved by an external modulation system that modulates light emitted from a semiconductor laser by an external optical modulator other than the semiconductor laser while keeping the semiconductor laser emitting the light with a constant optical output. Therefore, external optical modulators have been increasingly developed. The external optical modulators can be composed of dielectric materials such as LiNbO3 or semiconductor materials such as InP, GaAs. In particular, semiconductor optical modulators are attractive since they can be integrated with optical elements such as a semiconductor laser, an optical amplifier or electronic circuits such as FET and can be easily miniaturized and operated with a reduced voltage.

Semiconductor optical modulators include absorption-type optical modulators in which the intensity modulation is conducted by varying an optical absorption coefficient based on an effect that the absorption edge is shifted to a long-wave end by applying an electric field, e.g., a Franz-Keldish effect in bulk semiconductor or a quantum confined Stark effect in multiquantum well(MQW), and Mach-Zehnder-type modulators which utilize a refractive index variation caused by an electrooptic effect(Pockels effect) or a quantum confined effect in bulk semiconductor.

In Mach-Zehnder-type modulators, in principle, chirping can be reduced to zero. However, since they have a interference-type structure, a simple linear waveguide structure as in absorption-type modulators cannot be obtained; therefore their fabrication and operation are complicated. On the other hand, in absorption-type modulators, wavelength chirping is much lower than that of semiconductor laser direct modulation systems, but it cannot be reduced to zero. In electroabsorption-type optical modulators, when an electric field corresponding to an electrical signal is applied to an optical absorption layer, the absorption coefficient for an incident light with a wavelength($\lambda_{op}$) longer than the absorption-edge wavelength of the optical absorption layer of the modulator is increased to extinguish the incident light. FIG. 1 shows detuning $\Delta\lambda$ (a difference between the wavelength of an incident light and the absorption-edge wavelength of the optical absorption layer) and applied electric field dependencies of the absorption coefficient. By setting detuning to an appropriate value, good extinction characteristics; can be obtained. Thus, an external electrical signal can be converted into ON/OFF light state. In this case, the refractive index of the optical absorption layer to the incident light also varies as shown in FIG. 2. Namely, when the intensity of the electric field varies from zero to a value to conduct absorption modulation, the refractive index of the optical absorption layer also varies. The magnitude of chirping when conducting ON/OFF light state is proportional to the ratio $\Delta n/\Delta\alpha$ of a refractive index variation $\Delta n$ to an absorption variation $\Delta\alpha$. Therefore, since $\Delta n \geq 0$ and $\Delta\alpha \geq 0$ are usually obtained, positive chirping occurs. However, if the difference between the wavelength of incident light, $\lambda_{op}$ and the absorption-edge wavelength of the optical absorption layer, $\lambda_g$, i.e., detuning $\Delta\lambda_{op}$ ($=\lambda_{op}-\lambda_g$) is decreased, $\Delta n \leq 0$ and $\Delta\lambda \geq 0$ can be satisfied, therefore allowing negative chirping operation. But, since the absorption coefficient is increased, a sufficient light output cannot be obtained in the ON light state. Recently, it has been experimentally proved that the chirping can be reduced by superposing a signal electric field corresponding to an electrical signal after applying a constant electric field to an electroabsorption-type optical modulator. Such an electroabsorption-type optical modulator is expected to be a modulator for ultra-high speed and long distance optical communications in the future.

For example, such an electroabsorption-type optical modulator is reported in K. Yamada et al.,"Low-Chirp, Low-Polarization Dependent Characteristics of Electroabsorption Optical Intensity Modulator with an InGaASP Bulk", The Institute of Electronics Information and Information Engineers(IEICE), 1995 General Meeting, annex paper vol.1, p.349(lecture No. C-349). In this report, it is described that fiber dispersion durability in 10 Gb/s transmission and 1.55 $\mu$m wavelength can be enhanced by superposing an electrical signal after applying a constant bias to the modulator to overcome dispersion limitations due to transmission distance. Also, K. Morito et al.,"10 Gb/s Transmission over 100 km of Standard Fiber with a Blue Chirp", IEICE, 1995 Electronics Society Meeting, annex paper vol.1, p.301(lecture No.C-301) reports an example of an electroabsorption optical modulator with a MQW structure, which is integrated with a DFB laser. In this report, it is described that dispersion durability in 10 Gb/s-100 km transmission can be enhanced by pre-applying a constant bias of 1.1 V to the modulator.

As described above, the pre-bias applying techniques where a constant bias is pre-applied to the electroabsorption-type optical modulator have merits that chirping can be reduced and limitations to transmission distance due to dispersion can be overcome. However, there occur problems that the emission power in the ON state of light is decreased and the extinction ratio is deteriorated when the pre-bias is applied. Furthermore, a drive circuit(bias T circuit) for applying a constant bias to an external electrical signal as shown in FIG. 3 is required.

SUMMARY OF THE INVENTION

Accordingly, it is an object of the invention to provide an electroabsorption-type optical modulator in which negative chirp during modulation can be obtained without pre-applying a constant bias and sufficient light emission power and good extinction ratio can be obtained.

It is a further object of the invention to provide a method for making such an electroabsorption-type optical modulator.

It is a still further object of the invention to provide an optical communication module which adopts such an electroabsorption-type optical modulator.

It is a still yet further object of the invention to provide an optical communication system which adopts such an electroabsorption-type optical modulator.

According to the invention, an electroabsorption-type optical modulator, comprises:
  a semiconductor substrate; and
  a semiconductor buffer layer, a semiconductor optical absorption layer and a semiconductor cladding layer which are layered in order on the semiconductor substrate;
    wherein the absorption of a light wave supplied to an end of the semiconductor optical absorption layer is controlled by changing an intensity of electric field applied to the semiconductor optical absorption layer; and
    the semiconductor optical absorption layer has a first region with absorption-edge wavelength shorter than that of second region of the semiconductor optical absorption layer and a voltage corresponding an external electrical signal is simultaneously applied to both the first and second regions of the semiconductor optical absorption layer, so that, to an incident light, a refractive index of the semiconductor optical absorption layer is decreased and an absorption coefficient of the semiconductor optical absorption layer is increased when an intensity of electric field applied to the semiconductor optical absorption layer corresponding to the external electrical signal is increased.

Also, according to the invention, an electroabsorption-type optical modulator, comprises:
  a semiconductor substrate; and
  a semiconductor buffer layer, a semiconductor optical absorption layer and a semiconductor cladding layer which are layered in order on the semiconductor substrate;
    wherein the absorption of a light wave supplied to an end of the semiconductor optical absorption layer is controlled by changing an intensity of electric field applied to the semiconductor optical absorption layer; and
    the semiconductor optical absorption layer has absorption-edge wavelengths which continuously vary along the direction of waveguiding an incident light from a short-wave side to a long-wave side or from a long-wave side to a short-wave side, so that, to an incident light, a refractive index of the semiconductor optical absorption layer is decreased and an absorption coefficient of the semiconductor optical absorption layer is increased when an intensity of electric field applied to the semiconductor optical absorption layer corresponding to the external electrical signal is increased.

Also, according to the invention, an electroabsorption-type optical modulator, comprises:
  a semiconductor substrate; and
  a semiconductor buffer layer, a semiconductor optical absorption layer and a semiconductor cladding layer which are layered in order on the semiconductor substrate;
    wherein the absorption of a light wave supplied to an end of the semiconductor optical absorption layer is controlled by changing an intensity of electric field applied to the semiconductor optical absorption layer; and
    the semiconductor optical absorption layer has absorption-edge wavelengths which vary stepwise along the direction of waveguiding an incident light, so that, to an incident light, a refractive index of the semiconductor optical absorption layer is decreased and an absorption coefficient of the semiconductor optical absorption layer is increased when an intensity of electric field applied to the semiconductor optical absorption layer corresponding to the external electrical signal is increased.

According to another aspect of the invention, a method for making a semiconductor optical modulator, comprises the steps of:
  forming a first semiconductor buffer layer on a semiconductor substrate;
  forming a first dielectric mask for selective growth on the first semiconductor buffer layer, the first dielectric mask including two regions in which a dielectric mask width is partially varied and a blank region sandwiched by the two regions;
  forming a second semiconductor buffer layer, a semiconductor optical absorption layer and a semiconductor cladding layer in order on the blank region;
  forming a second dielectric mask for selective growth which has a blank region broader than the blank region of the first dielectric mask;
  forming a semiconductor cladding layer and a semiconductor capping layer in order on the blank region of the second dielectric mask for selective growth;
  forming a first dielectric protective film over the entire top surface of the substrate;
  forming a second dielectric protective film on the first dielectric protective film;
  removing the first dielectric protective film and the second dielectric protective film until the semiconductor capping layer is exposed;
  forming an electrode for applying an electric field to the semiconductor optical absorption layer on the semiconductor capping layer; and
  removing the second dielectric protective film except under the electrode;
    wherein the electrode on the semiconductor capping layer is formed all over the semiconductor optical absorption layer, so that a voltage corresponding to an external signal is uniformly applied to the semiconductor optical absorption layer.

According to a further aspect of the invention, an optical communication module, comprises:
  the electroabsorption-type optical modulator defined above;
  a first light-condensing means for optically coupling an input light to the semiconductor optical absorption layer of the electroabsorption-type optical modulator; and
  a second light-condensing means for optically coupling a light output from the semiconductor optical absorption layer to an external optical fiber.

According to a further aspect of the invention, an optical communication system, comprises:
  a transmitter which includes the electroabsorption-type optical modulator defined above;

means for externally waveguiding a light output from the transmitter; and a receiver for receiving the light output from the waveguiding means.

In this invention, the semiconductor electroabsorption-type optical modulator has an optical absorption layer with a plurality of regions with different absorption-edge wavelengths along the direction of waveguiding a light, i.e., the optical absorption layer includes a region where a absorption-edge wavelength is shifted to a long-wave side. Therefore, when a uniform electric field is applied to the regions, as the entire modulator, the refractive index is varied to a negative direction and the absorption coefficient is increased. Also, the ratio of lengths of the short-wave side and the long-wave side of the absorption layer is properly determined so that the absorption coefficient of the entire absorption layer is sufficiently small when no bias is applied. Thus, negative chirp during a modulation can be obtained without pre-applying a constant bias and sufficient light emission power and good extinction ratio can be obtained.

To provide such a structure, this invention employs a bandgap control technique using a selective MOVPE(metal organic vapor phase epitaxy) method. According as each of the widths of dielectric mask regions on both sides of the blank region is partially varied, the absorption-edge wavelength of the optical absorption layer is partially varied. By using the crystal growth method, the optical absorption layer with partially different absorption-edge wavelengths can be formed in one growth step, i.e., it is not necessary to repeat etching and crystal growth for divided regions. Therefore, an electroabsorption-type optical modulator can be made with good uniformity, reproducibility and controllability.

BRIEF DESCRIPTION OF THE DRAWINGS

The invention will be explained in more detail in conjunction with the appended drawings, wherein:

FIGS. 5A to 5H are cross sectional views showing a method for making the InP-system MQW electroabsorption-type optical modulator in the first embodiment, FIGS. 12A to 12H are cross sectional views showing a method for making the InP-system MQW electroabsorption-type optical modulator in the second embodiment.

DESCRIPTION OF THE PREFERRED EMBODIMENTS

A InP-system multiquantum well(MQW) electroabsorption-type optical modulator and a method for making the same in the first preferred embodiment will be explained in FIGS.4, 5A to 5H, 6, 7 and 10.

Figure 1:
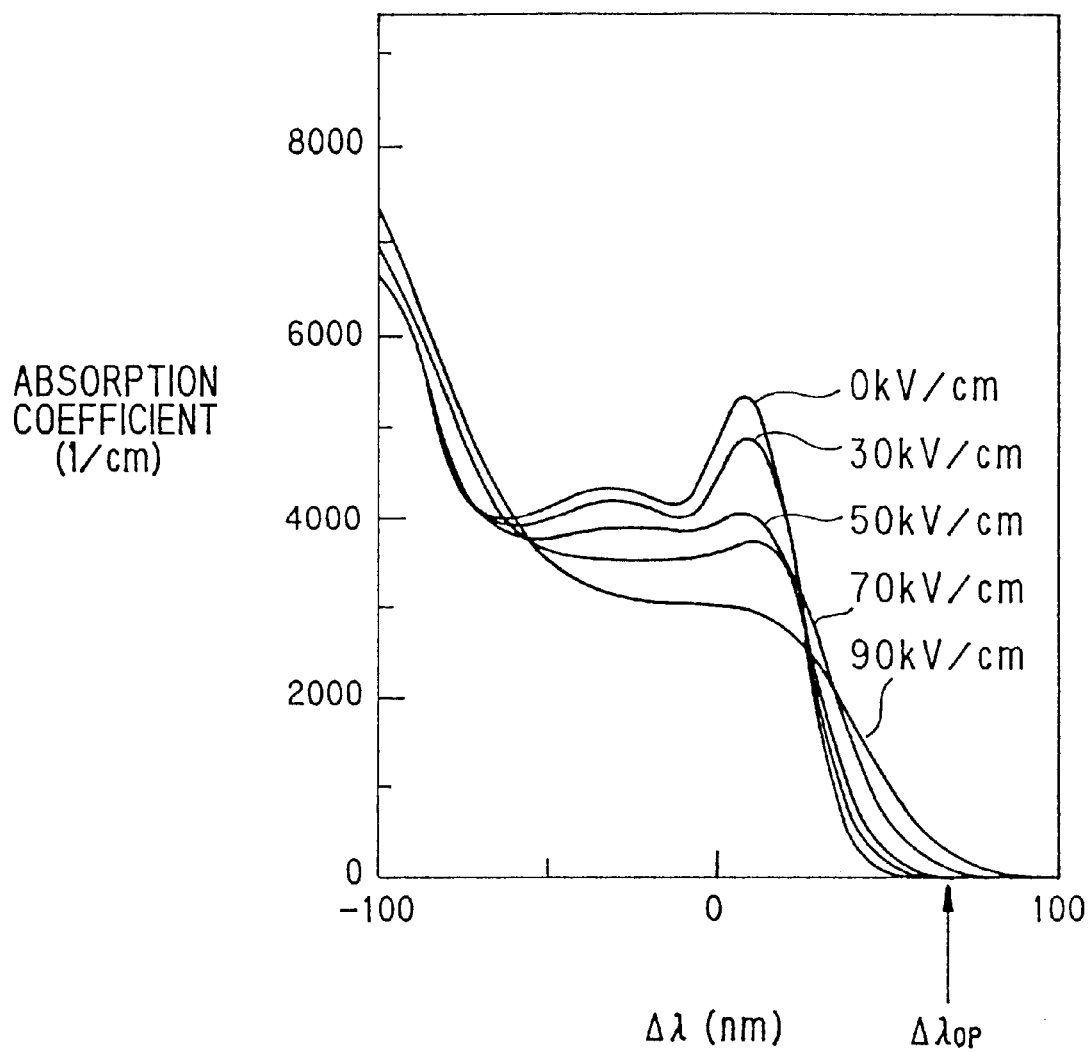
FIG. 1 shows the detuning and applied electric field dependencies of an absorption coefficient of an optical absorption layer in a conventional electroabsorption-type optical modulator.
Figure 2:
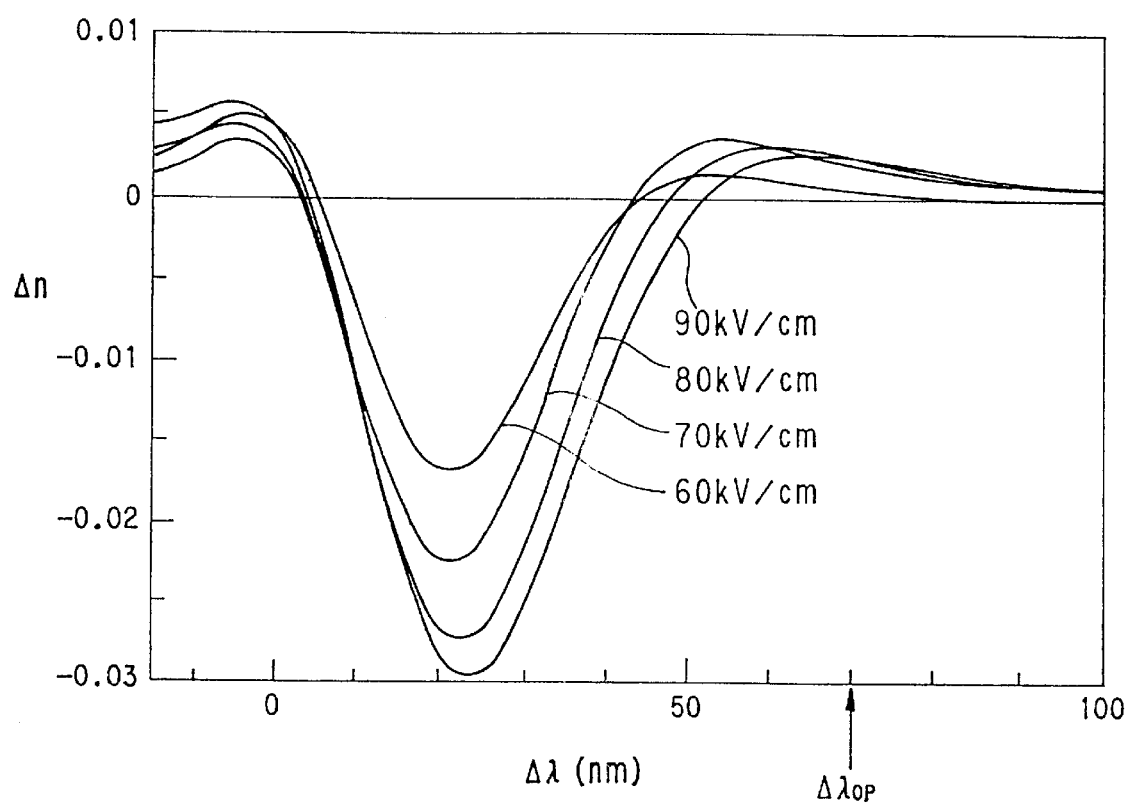
FIG. 2 shows detuning and applied electric field dependencies of the refractive index of an optical absorption layer in a conventional electroabsorption-type optical modulator.
Figure 3:
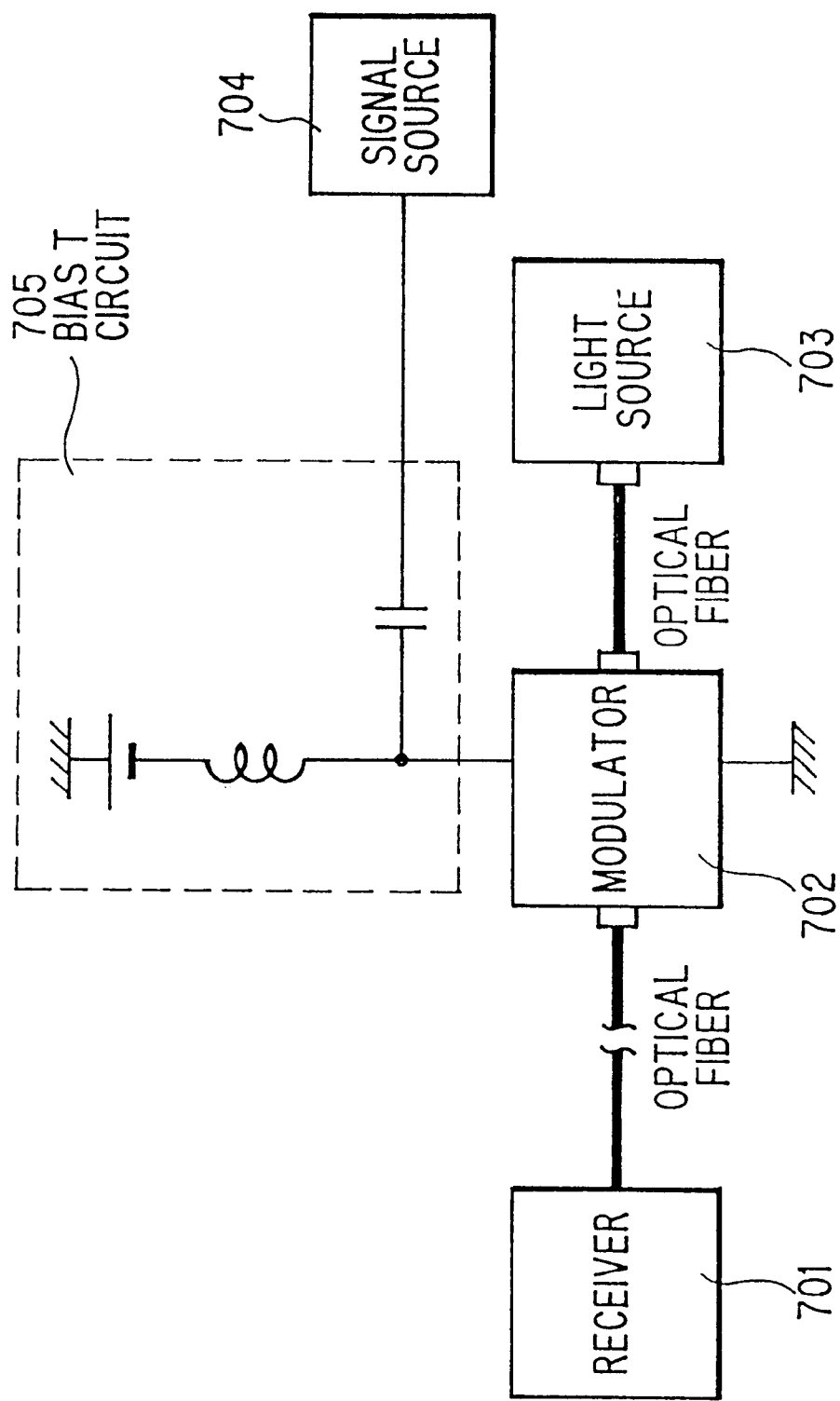
FIG. 3 is a block diagram showing a driving method in conventional electroabsorption-type optical modulators.
Figure 4:
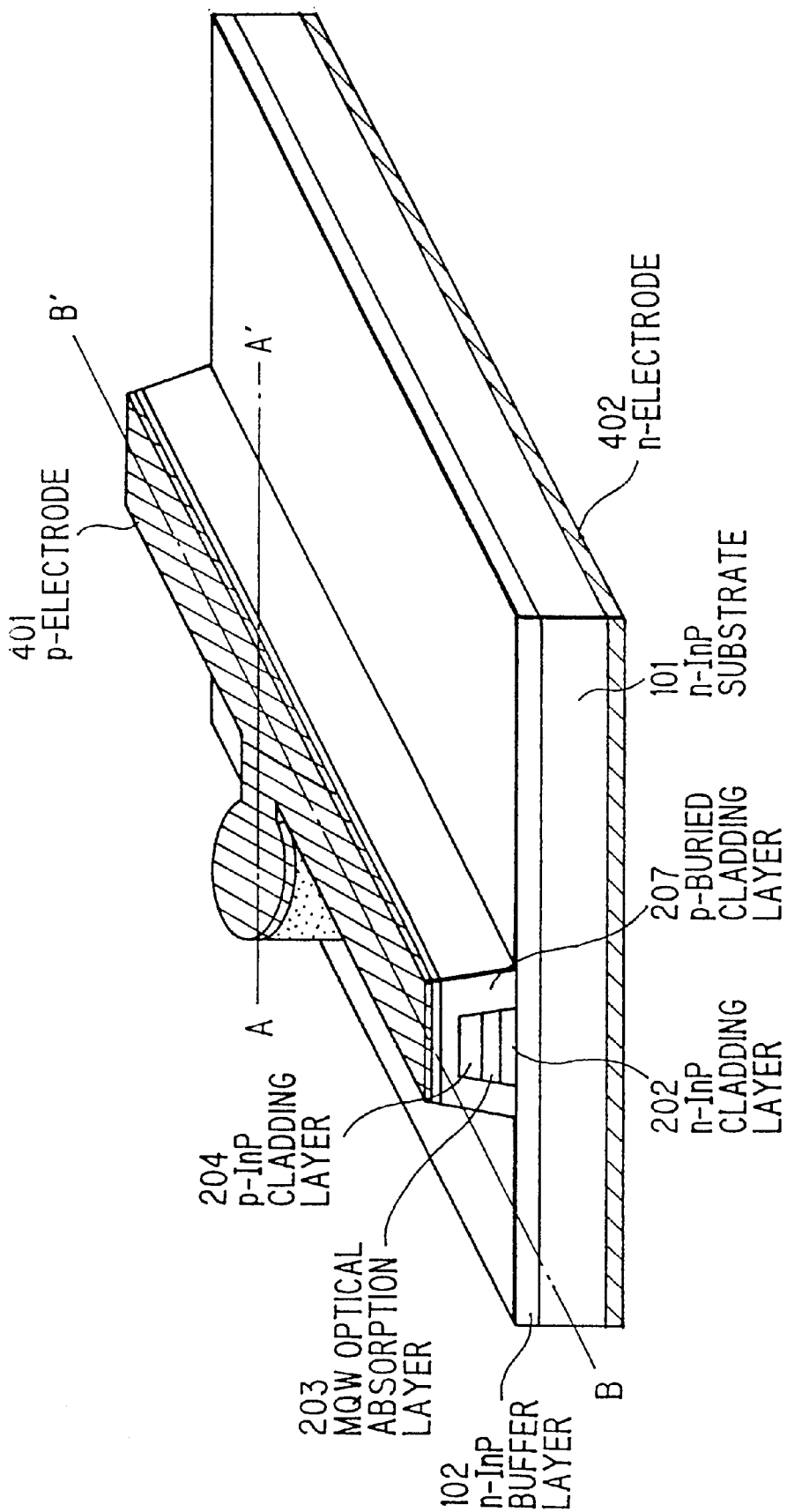
FIG. 4 is a perspective view showing a InP-system MQW electroabsorption-type optical modulator in a first preferred embodiment of the invention.

FIGS. 5A to 5H show a method for making the InP-system multiquantum well(MQW) electroabsorption-type optical modulator, wherein FIGS. 5A to 5H are cross sectional views cut along the line I–I' in FIG. 4.

Figure 6:
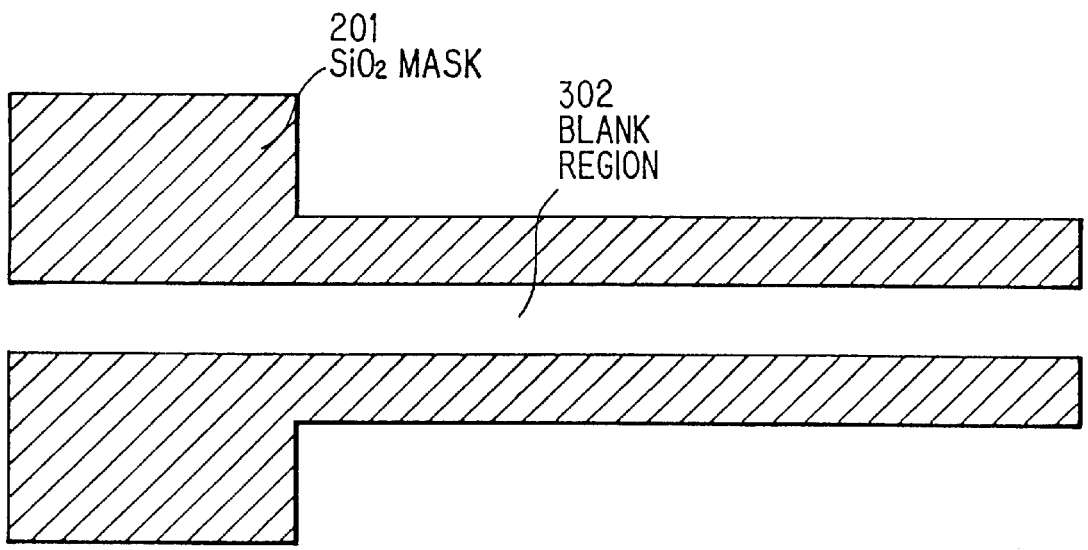
FIG. 6 is a plan view showing an example of a first mask pattern for selective growth used to make the InP-system MQW electroabsorption-type optical modulator in the first embodiment.
Figure 7:
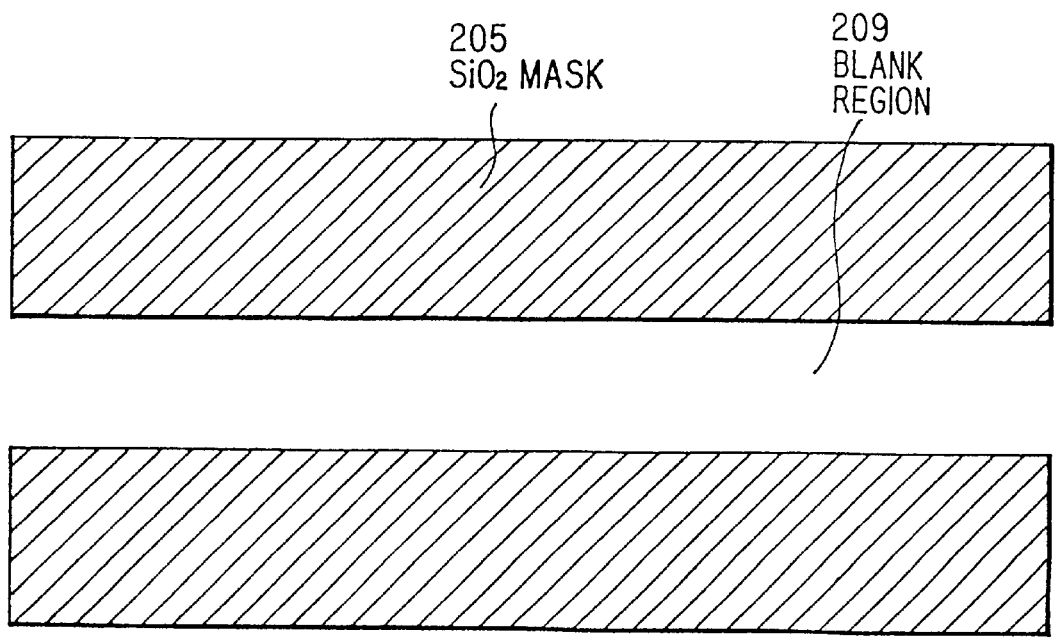
FIG. 7 is a plan view showing an example of a second mask pattern for selective growth used to make the InP-system MQW electroabsorption-type optical modulator in the first embodiment.
Figure 10:
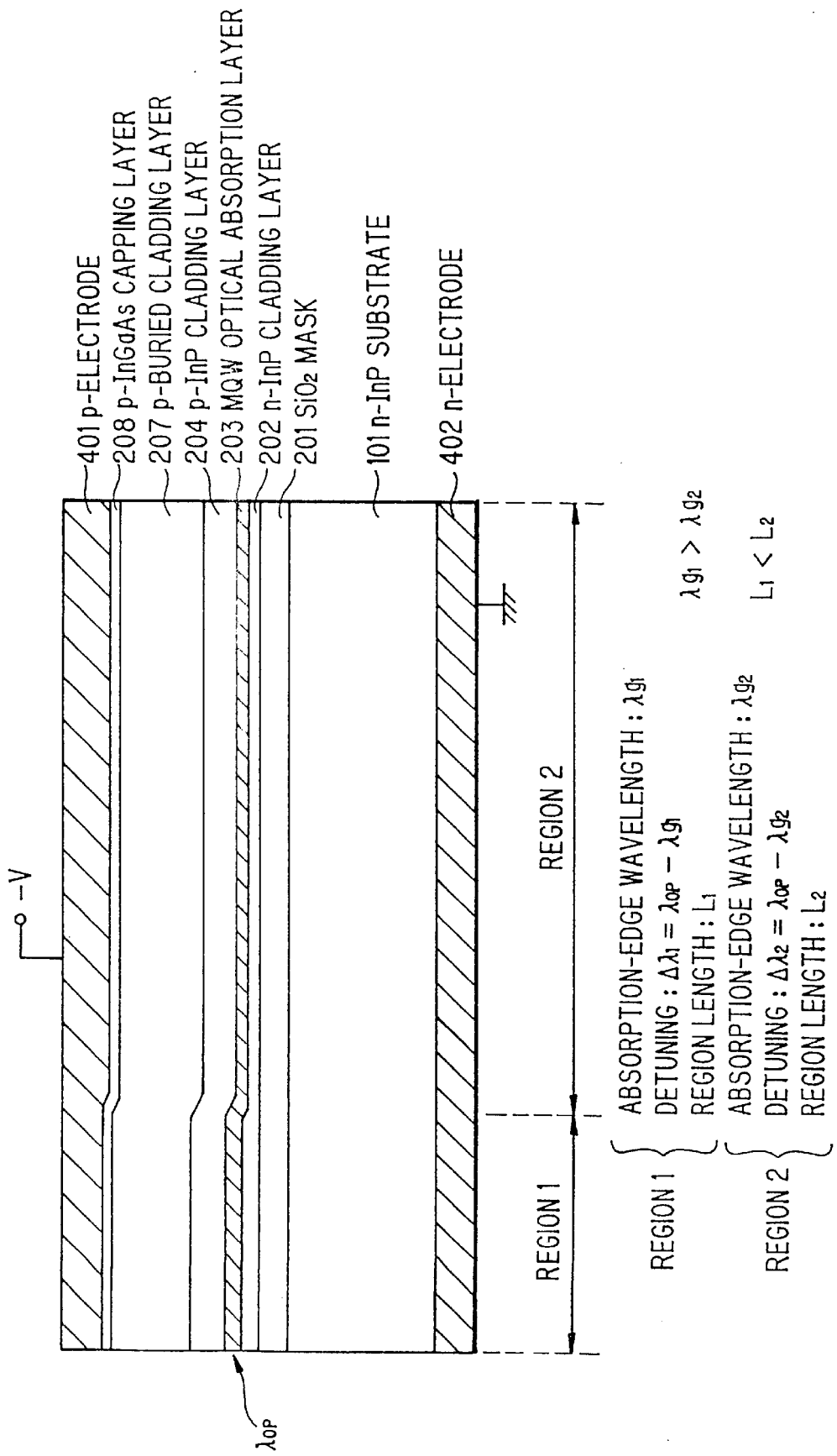
FIG. 10 is a longitudinal sectional view cut along the line I–I' in FIG. 4.

First, an n-InP buffer layer 102 with a thickness of 0.8 μm and a carrier concentration of $1 \times 10^{17}$ cm$^{-3}$ is formed on the entire surface of an (100) directed n-InP substrate 101(FIG. 5A). Then, a SiO$_2$ film with a thickness of 1000 Å to provide a dielectric mask for selective growth is grown thereon, patterning the SiO$_2$ film using a standard photolithography technique, thereby forming a first SiO$_2$ mask 201 for selective growth(FIG. 5B). FIG. 6 shows the pattern of the first SiO$_2$ mask 201 for selective growth which is viewed from a position over the wafer. In a blank region 302 which is sandwiched between two regions of the SiO$_2$ mask 201, an absorption layer of an electroabsorption-type optical modulator is formed. In the blank region 302, an absorption layer for a long-wave side absorption-edge wavelength corresponding to the narrow-width area of the SiO$_2$ mask 201 and an absorption layer for a short-wave side absorption-edge wavelength corresponding to the broad-width area of the SiO$_2$ mask 201 are formed. Next, using a selective MOVPE (metal organic vapor phase epitaxy) crystal growth method with the SiO$_2$ mask, an n-InP cladding layer 202 with a thickness of 700 Å and a carrier concentration of $1 \times 10^{17}$ cm$^{-3}$, a MQW optical absorption layer 203(eighteen periods of InGaAsP(6 nm)/InGaAsP(5.8 nm)) with a thickness of 2124 Å and a carrier concentration of $5 \times 10^{15}$ cm$^{-3}$, and a p-InP cladding layer 204 with a thickness of 1600 Å and a carrier concentration of $5 \times 10^{17}$ cm$^{-3}$ are formed in order (FIG. 5C). Then, a SiO₂ film is formed on the entire surface of the wafer, subsequently forming a second SiO₂ mask 205 for selective growth which is used to bury the optical absorption layer by photolithography(FIG. 5D). FIG. 7 shows the pattern of the second SiO₂ mask 205 for selective growth which is viewed from a position over the wafer. A blank region 209 between the second SiO₂ mask 205 for selective growth has a width greater than that of the first SiO₂ mask 201 for selective growth. Then, using a selective MOVPE crystal growth method with the second SiO₂ mask 205 for selective growth, a p-buried cladding layer 207 with a thickness of 1.6 $\mu$m and a carrier concentration of $5\times10^{17}$ cm$^{-3}$, and a p-InGaAs capping layer 208 with a thickness of 0.25 $\mu$m and a carrier concentration of $1\times10^{19}$ cm$^{-3}$ are formed(FIG. 5E). Then, after forming a SiO₂ protective film 300 with a thickness of 1000 Å on the entire surface of the wafer, a polyimide film 301 with a thickness of 3 $\mu$m is formed thereon(FIG. 5F). Then, the polyimide film 301 and the SiO₂ protective film 300 are uniformly removed until the p-InGaAs capping layer 208 is exposed, a p-electrode 401 of Cr/Au is formed(FIG. 5G). Then, the polyimide film 301 except under the p-electrode 401 is removed, and an n-electrode 402 of Cr/Au(FIG. 5H) is formed. Finally, after cleaving the device, and applying a reflectionless coating on the end surfaces for emission and incidence of light, the device fabrication is completed. FIG. 10 is a cross sectional view of the fabricated device cut along the line II–II' in FIG. 4. The absorption-edge wavelength $\lambda_{g1}$ in region 1 is set to be longer than the absorption-edge wavelength $\lambda_{g2}$ in region 2.

Figure 8:
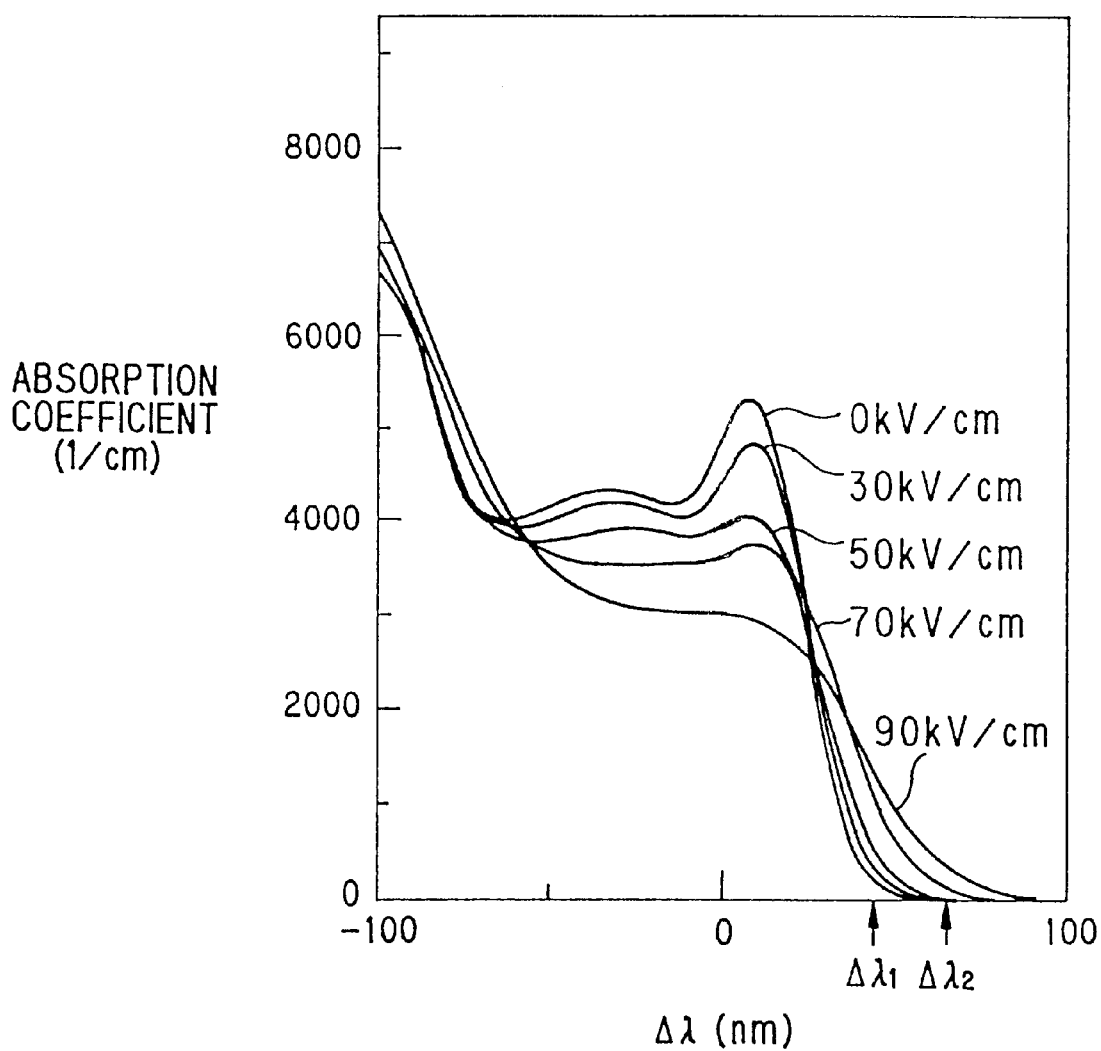
FIG. 8 shows detuning and applied electric field dependencies of an absorption coefficient of an optical absorption layer in the InP-system MQW electroabsorption-type optical modulator in the first embodiment.
Figure 9:
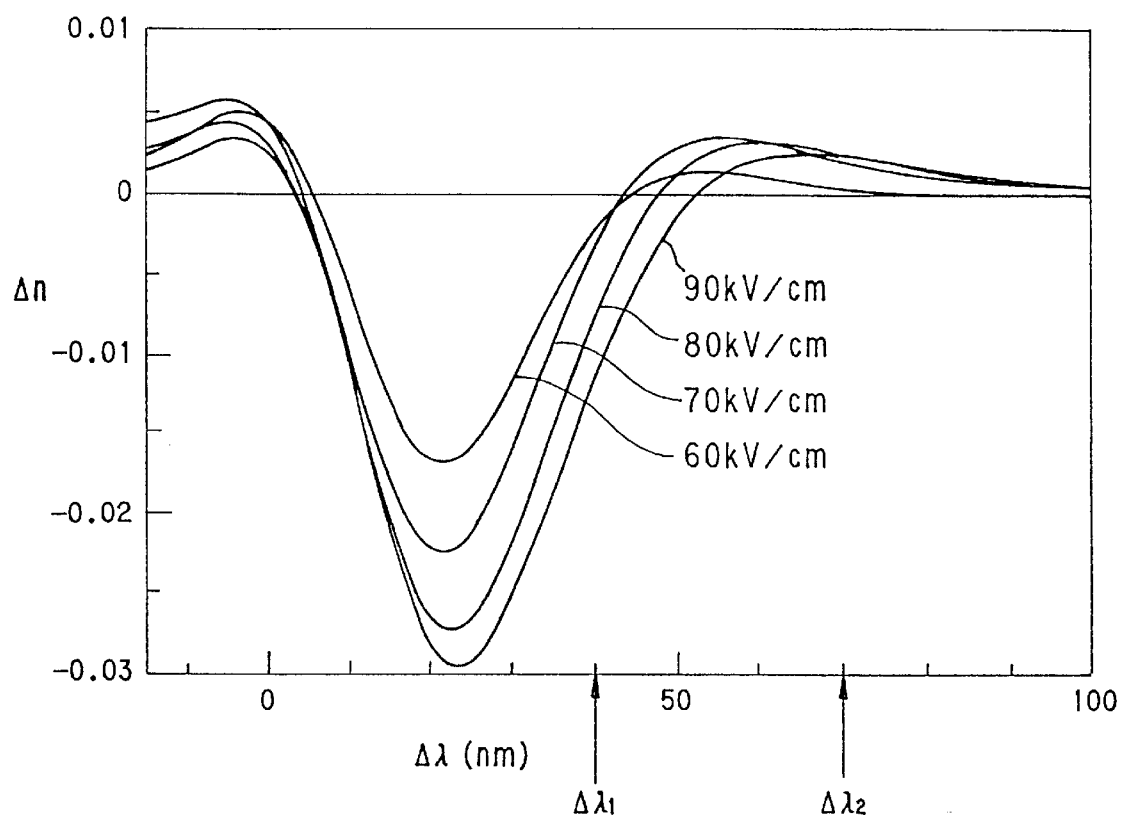
FIG. 9 shows detuning and applied electric field dependencies of an refractive index of the optical absorption layer in the InP-system MQW electroabsorption-type optical modulator in the first embodiment.

The operation of the InP-system MQW electroabsorption-type optical modulator fabricated by the above process will be explained below. A light wave with a wavelength of 1.55 $\mu$m supplied to the InP-system MQW electroabsorption-type optical modulator shown in FIG. 4 is emitted substantially without being absorbed when an external bias of 0V is applied to the modulator(light ON state), and it is absorbed to extinguish the light when an external bias of 2V is applied(light OFF state). In this regard, variations of the absorption coefficient and the refractive index in the long-wave and short-wave sides of the optical absorption layer of the electroabsorption-type optical modulator are shown in FIGS. 8 and 9. The electric field intensities of 0 kV/cm to 90 kV/cm correspond to the applied signal biases 0V to 2V, and the variation of refractive index $\Delta n_1$ is −0.013 to the short-wave side detuning(difference between the incident light wavelength and the absorption-edge wavelength of the optical absorption layer) $\Delta\lambda_1$=40 nm and the variation of refractive index $\Delta n_2$ is 0.0025 to the long-wave side detuning $\Delta\lambda_2$=70 nm. The waveguide length of the short-wave side optical absorption layer $L_1$ is 30 $\mu$m and the waveguide length of the long-wave side optical absorption layer $L_2$ is 150 $\mu$m. The phase variation $\Delta\Phi$ of an incident light caused by the signal bias change from the OFF state to the ON state is given by:

$$\Delta\Phi = \frac{2\pi}{\lambda}(L_1 \cdot \Delta n_1 + L_2 \cdot \Delta n_2) \leq 0$$

($\lambda$:wavelength of incident light). The parameter $\alpha$ that represents chirping is given by:

$$\alpha = 2I\frac{\Delta I}{\Delta\Phi}$$

where I represents the intensity of incident light and $\Delta I$ represents a variation of I. Thus, the electroabsorption-type optical modulator has a characteristic of $\alpha \leq 0$.

Though the absorption coefficient in the ON state(applied signal bias of 0V) is increased as the detuning is shifted to the short-wave side, the absorption loss in the ON state can be kept to be quite small since the waveguide length $L_1$(=30 $\mu$m) of the optical absorption layer with the short-wave side detuning in the electroabsorption-type optical modulator is sufficiently short.

As explained above, in the first embodiment, negative chirping modulation operation can be performed without pre-applying a DC bias and without causing an increase in absorption loss.

Meanwhile, in the electroabsorption-type optical modulator shown in FIG. 4, since the polyimide film 301 is buried deeply under pad, the pad capacity can be reduced. Thus, by reducing electrode capacity, the electroabsorption-type optical modulator in the first embodiment can be used for high-speed modulation such as 10 Gb/s.

The invention is not limited to the above embodiment, where the InP-system MQW structure electroabsorption-type optical modulator is used, and may employ, for example, an InGaAs/InP MQW or an Al-system MQW. Also, the invention is not limited to the device formed, for example, of the thicknesses and compositions of the respective layers(films) or the dimension of the waveguide, in the first embodiment.

An InP-system multiquantum well(MQW) electroabsorption-type optical modulator and a method for making the same in the second preferred embodiment will be explained in FIGS. 11, 12A to 12H and 13 to 15.

Figure 11:
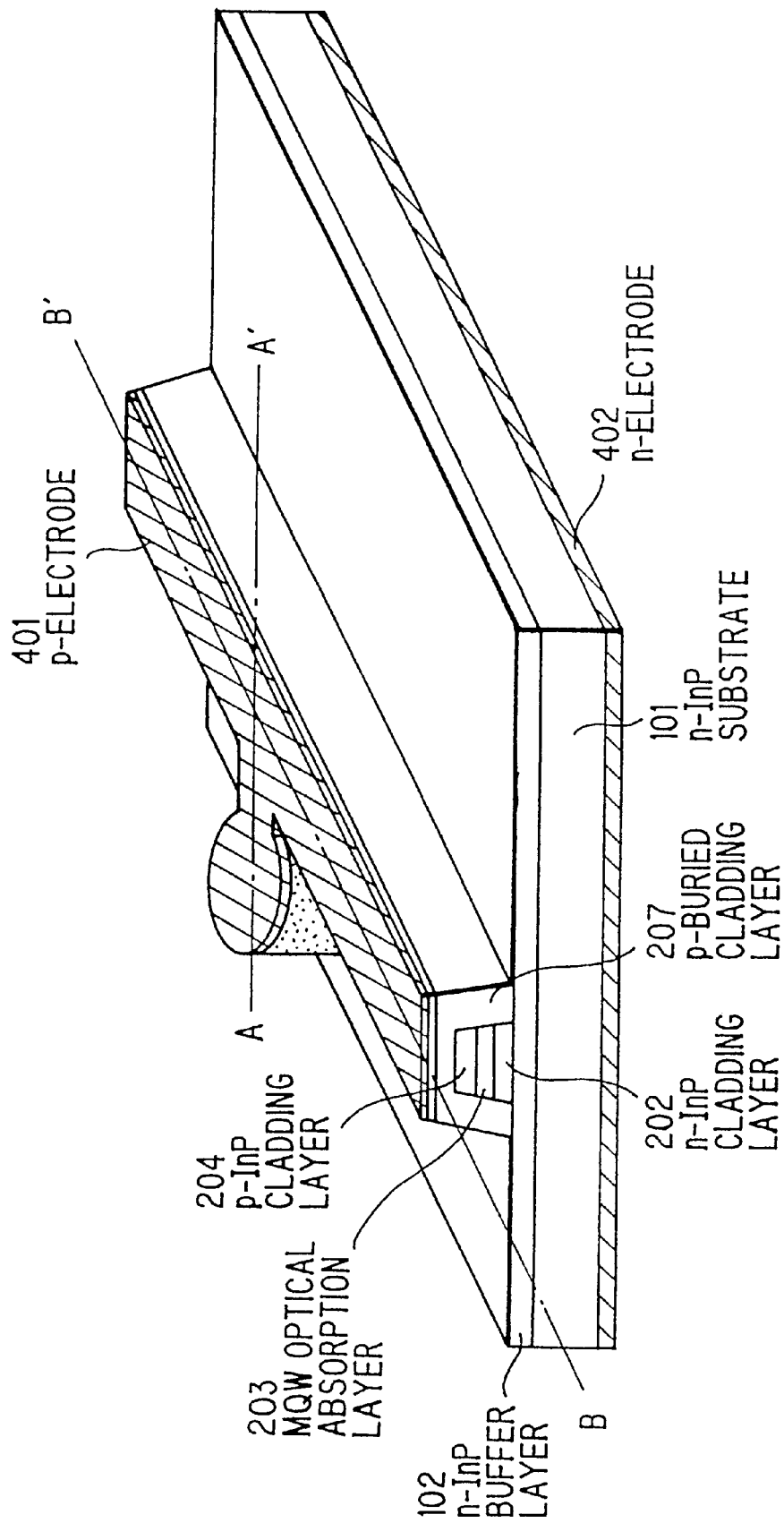
FIG. 11 is a perspective view showing an InP-system MQW electroabsorption-type optical modulator in a second preferred embodiment of the invention.

FIGS. 12A to 12H show a method for making the InP-system multiquantum well(MQW) electroabsorption-type optical modulator, wherein FIGS. 12A to 12H are cross sectional views cut along the line I–I' in FIG. 11.

Figure 13:
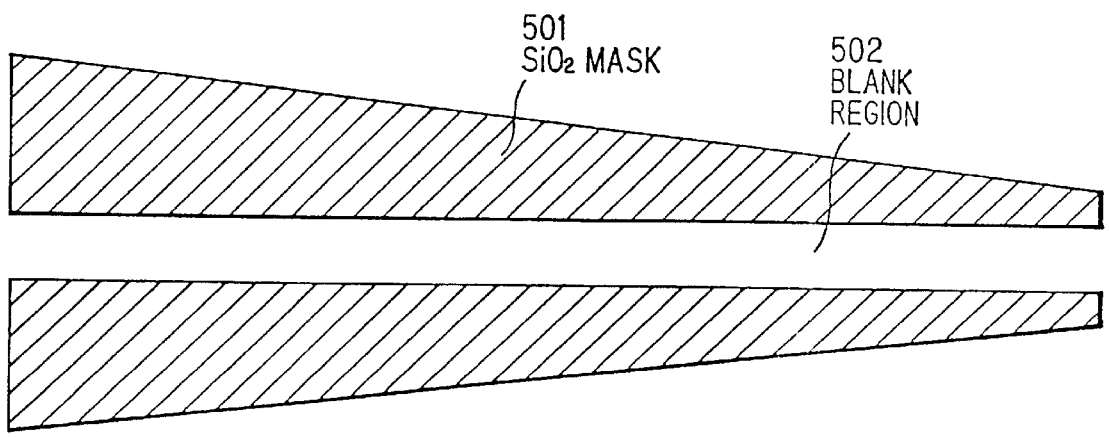
FIG. 13 is a plan view showing an example of a first mask pattern for selective growth used to make the InP-system MQW electroabsorption-type optical modulator in the second embodiment.
Figure 14:
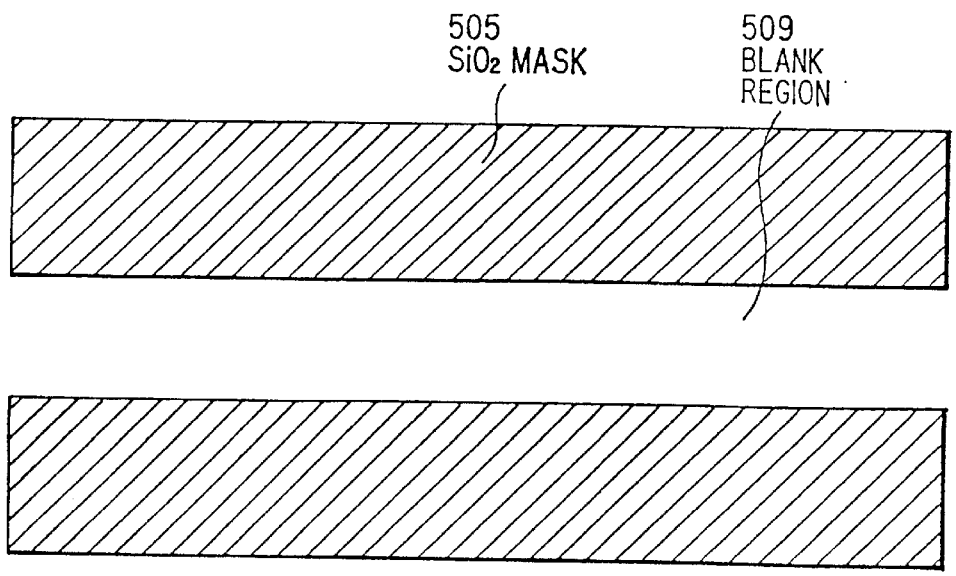
FIG. 14 is a plan view showing an example of a second mask pattern for selective growth used to make the InP-system MQW electroabsorption-type optical modulator in the second embodiment.
Figure 15:
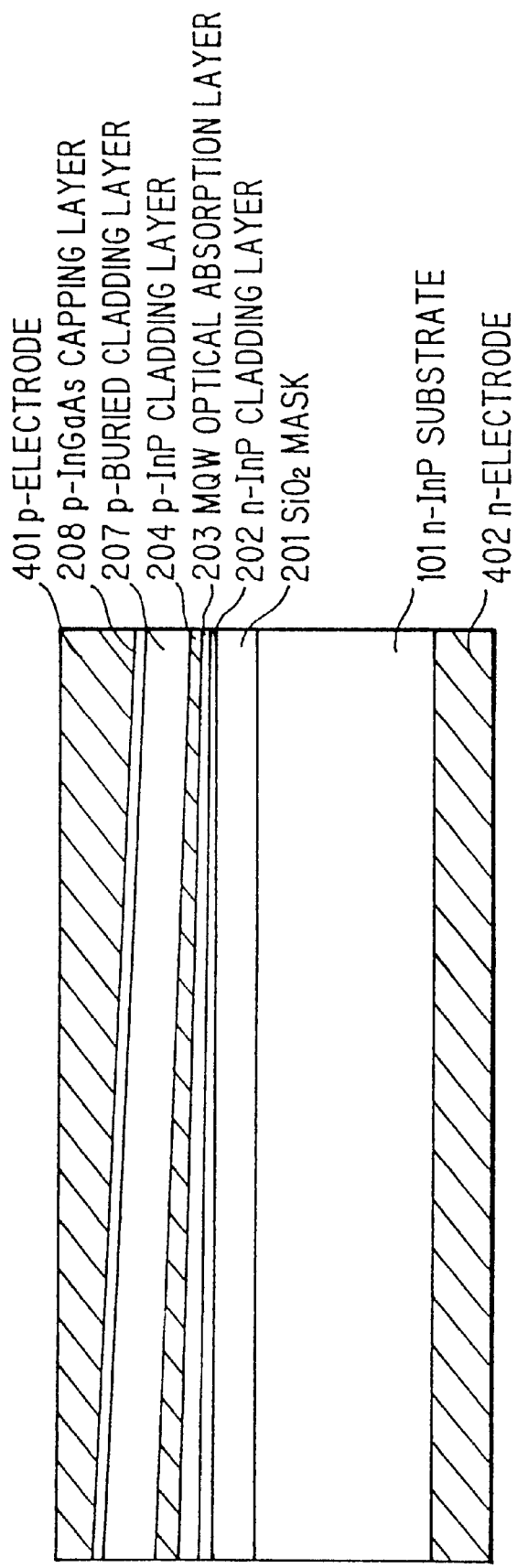
FIG. 15 is a longitudinal sectional view cut along the line II–II' in FIG. 11.

First, a n-InP buffer layer 102 with a thickness of 0.8 $\mu$m and a carrier concentration of $1\times10^{17}$ cm$^{-3}$ is formed on the entire surface of an (100) directed n-InP substance 101(FIG. 12A). Then, a SiO₂ film with a thickness of 1000 Å to provide a dielectric mask for selective growth is grown thereon, patterning the SiO₂ film using a standard photolithography technique, thereby forming a first SiO₂, mask 501 for selective growth (FIG. 12B). FIG. 13 shows the pattern of the first SiO₂ mask 501 for selective growth which is viewed from a position over the wafer. In a blank region 502 which is sandwiched between two regions of the SiO₂ mask 501, an absorption layer of an electroabsorption-type optical modulator is formed. In the region 502, on both sides of which the width of the SiO₂ mask 501 is decreased along the direction of waveguiding light, an absorption layer for a long wave side absorption-edge wavelength corresponding to the narrow-width area of the SiO₂ mask 501 and an absorption layer for a short-wave side absorption-edge wavelength corresponding to the broad-width area of the SiO₂ mask 501 are formed. Next, using a selective MOVPE crystal growth method with the SiO₂ mask, an n-InP cladding layer 202 with a thickness of 700 Å and a carrier concentration of $1\times10^{17}$ cm$^{-3}$, a MQW optical absorption layer 203(eighteen periods of InGaAsP(6 nm)/InGaAsP(5.8 nm)) with a thickness of 2124 Å and a carrier concentration of $5\times10^{15}$ cm$^{-3}$, and a p-InP cladding layer 204 with a thickness of 1600 Å and a carrier concentration of $5\times10^{17}$ cm$^{-3}$ are formed in order(FIG. 12C). Then, a SiO₂, film is formed on the entire surface of the wafer, subsequently forming a second SiO₂ mask 505 for selective growth which is used to bury the optical absorption layer by photolithography(FIG. 12D). FIG. 14 shows the pattern of the second SiO₂ mask 505 for selective growth which is viewed from a position over the wafer. A blank region 509 between the second SiO₂ mask 505 for selective growth has a width greater than that of the first SiO$_2$ mask 501 for selective growth. Then, using a selective MOVPE crystal growth method with the second SiO$_2$ mask 505 for selective growth, a p-buried cladding layer 207 with a thickness of 1.6 µm and a carrier concentration of 5×10$^{17}$ cm$^{-3}$, and a p-InGaAs capping layer 208 with a thickness of 0.25 µm and a carrier concentration of 1×10$^{19}$ cm$^{-3}$ are formed(FIG. 12E) . Then, after forming a SiO$_2$ protective film 300 with a thickness of 1000 Å on the entire surface of the wafer, a polyimide film 301 with a thickness of 3 µm is formed thereon(FIG. 12F). Then, the polyimide film 301 and the SiO$_2$ protective film 300 are uniformly removed until the p-InGaAs capping layer 208 is exposed, and a p-electrode 401 of Cr/Au is formed(FIG. 12G). Then, the polyimide film 301 except under the p-electrode 401 is removed, and an n-electrode 402 of Cr/Au(FIG. 12H) is formed. Finally, after cleaving the device, and applying a reflectionless coating on The end surfaces for emission and incidence of light, the device fabrication is completed. FIG. 15 is a cross sectional view of the fabricated device cut along the line II–II' in FIG. 11. The absorption-edge wavelength $\lambda_g$ is set to be gradually changed from the long-wave side to the short-wave side along the direction of waveguiding light. Therefore, a sudden change of the absorption-edge wavelength in the optical absorption layer can be suppressed and reflection of a light wave or a radiation loss due to mode mismatching inside the optical absorption layer can be reduced and negative chirping achieved without applying a pre-bias.

Figure 16:
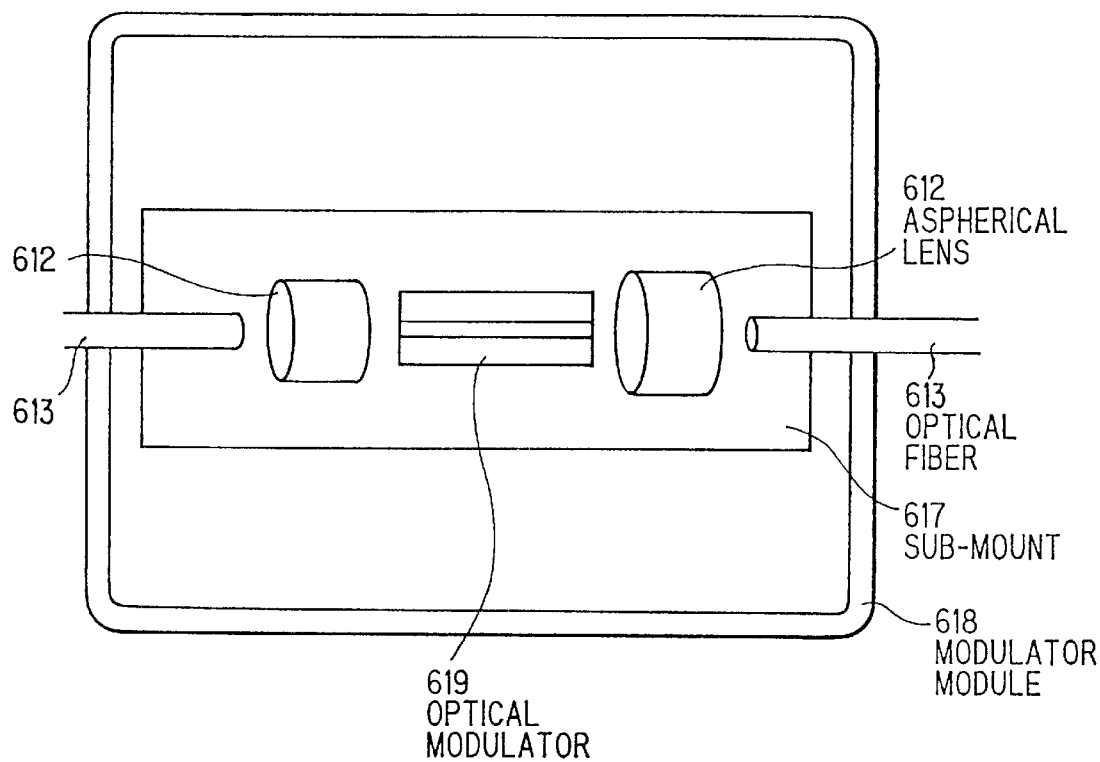
FIG. 16 is an illustration showing an optical communication module, which includes an electroabsorption-type optical modulator, in a third preferred embodiment of the invention.

An optical communication module in the third preferred embodiment of the invention will be explained in FIG. 16. As shown, a modulator module 618 for optical communications comprises a semiconductor electroabsorption-type optical modulator 619 of the first or second embodiment on a sub-mount 617, spherical lenses 612, 612 and optical fibers 613, 613. By using module 619, a high-speed transmission of optical signal with low insertion loss and low chirp can be achieved.

Figure 17:
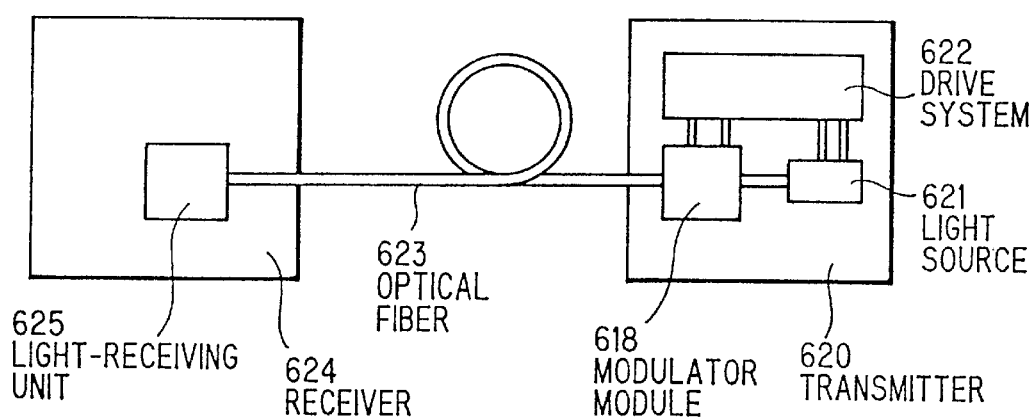
FIG. 17 is an illustration showing an optical communication system, which includes an optical communication module with an electroabsorption-type optical modulator, in a fourth preferred embodiment of the invention.

An optical communication system for a trunk line system in the fourth preferred embodiment of the invention, which adopts the modulator module 618 for optical communications, will be explained in FIG. 17. As shown, a transmitter includes a light source 621 for inputting a light to the modulator module 618 for optical communications and a drive system 622 for driving the modulator module 618 and the light source 621. The light from the light source 621 is converted into an optical signal by the modulator module 618 for optical communications, transmitted through an optical fiber 623, and detected by a light-receiving unit 625 of a receiver 624. By using the optical communication system in the fourth embodiment, a repeater-free optical transmission greater than 100 km can be easily realized. This is because signal deterioration caused by the dispersion in the optical fiber 623 can be significantly suppressed due to negative direction chirping.

As described above, according to the invention, an electroabsorption-type optical modulator, in which negative chirping modulation can be achieved without applying a constant bias and without increasing an absorption loss in the ON light state, can be achieved without requiring a complicated fabrication process and with good yield. In the invention, when the optical absorption waveguide of the electroabsorption-type optical modulator is fabricated, it can be formed by patterning a thin dielectric film such as SiO$_2$ to provide a mask for selective growth and conducting the selective crystal growth, without using any etching process of semiconductor.

Furthermore, to change the absorption-edge wavelength of the optical absorption layer in a specific region, the region needs only to be sandwiched with the SiO$_2$ mask. To finely pattern the thin dielectric film over the broad area with a good reproducibility is much easier than to etch a semiconductor up to an order of µm. Thus, using the method of the invention, an electroabsorption-type optical modulator with partial different absorption-edge wavelengths can be produced with good reproducibility.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method for making a semiconductor optical modulator, comprising the steps of:

forming a first semiconductor buffer layer on a semiconductor substrate;

forming a first dielectric mask for selective growth on said first semiconductor buffer layer, said first dielectric mask including two regions in which a dielectric mask width is partially varied and a blank region sandwiched by said two regions;

forming a first semiconductor cladding layer, a semiconductor optical absorption layer and a second semiconductor cladding layer in order on said blank region;

forming a second dielectric mask for selective growth which has a blank region broader than said blank region of said first dielectric mask;

forming a third semiconductor cladding layer and a semiconductor capping layer in order on said blank region of said second dielectric mask for selective growth;

forming a first dielectric protective film over the entire top surface of said substrate;

forming a second dielectric protective film on said first dielectric protective film;

removing said first dielectric protective film and said second dielectric protective film until said semiconductor capping layer is exposed;

forming an electrode for applying an electric field to said semiconductor optical absorption layer on said semiconductor capping layer; and removing said second dielectric protective film except under said electrode;

wherein said electrode on said semiconductor capping layer is formed all over said semiconductor optical absorption layer, so that a voltage corresponding to an external signal is uniformly applied to said semiconductor optical absorption layer.

2. A method for making a semiconductor optical modulator, according to claim 1, wherein:

said semiconductor optical absorption layer is composed of a multiquantum well structure.

* * * * *